(12) United States Patent
Landers

(10) Patent No.: US 6,596,204 B1
(45) Date of Patent: Jul. 22, 2003

(54) METHOD OF ENCAPSULATING A VOLATILE LIQUID

(76) Inventor: Phillip G. Landers, 5312 Vista Club Run, Sanford, FL (US) 32771

( * ) Notice: Subject to any disclaimer, the term of this patent is extended or adjusted under 35 U.S.C. 154(b) by 0 days.

(21) Appl. No.: 10/146,316

(22) Filed: May 15, 2002

(51) Int. Cl.$^7$ ................................................ B01J 13/22
(52) U.S. Cl. ........................ 264/4.33; 264/4.1; 264/4.3; 264/4.7; 427/213.3; 427/213.33; 427/213.34; 523/446; 523/466
(58) Field of Search .................... 264/4.1, 4.3, 4.33, 264/4.7; 427/213.33, 213.3, 213.34; 523/446, 466

(56) References Cited

U.S. PATENT DOCUMENTS

| | | | |
|---|---|---|---|
| 4,092,296 A | | 5/1978 | Skiff |
| 4,773,792 A | | 9/1988 | Landers |
| 5,730,912 A | * | 3/1998 | Redd ............................ 264/4 |
| 6,237,305 B1 | | 5/2001 | Landers |

* cited by examiner

*Primary Examiner*—Robert Dawson
*Assistant Examiner*—D. Aylward
(74) *Attorney, Agent, or Firm*—William M. Hobby, III

(57) ABSTRACT

A process of micro-encapsulating a volatile liquid includes selecting a volatile liquid, such as Isophorone, and porous ceramic particles for encapsulating the volatile liquid. The volatile liquid and porous particles are mixed and a vacuum is applied to the mixture to impregnate the volatile liquid in the porous particles. A polymer catalyst for the polymer resin, such as an epoxy catalyst for use with an epoxy resin, is mixed with the volatile liquid and porous particles to saturate the particles. The polymer resin, such as epoxy resin, is added to the mixture for forming a resin cured shell around the porous particle holding the volatile liquid to form a microencapsulated volatile liquid. The resin is only cured on the outer shell of the porous particle when coming in contact with the catalyst supported with the volatile liquid in the porous particle.

12 Claims, 1 Drawing Sheet

METHOD OF ENCAPSULATING A VOLATILE LIQUID

BACKGROUND OF THE INVENTION

This invention describes a method for micro-encapsulating a volatile liquid in a porous particle. A preselected porous particle of known weight and porosity is blended with the volatile liquid to be encapsulated, the quantity of volatile liquid being insufficient to fill all of the void spaces in each particle. The blended mixture is placed under vacuum which draws the liquid into the center of each particle. This partially filled particle is referred to hereafter as Part A. An additional volume of the volatile liquid is blended with a polymer resin catalyst (i.e. epoxy or polyurethane) at a predetermined ratio. This blend of polymer resin catalyst and volatile liquid is referred to hereafter as Part B.

Part A is blended with a specific volume of Part B, said volume is calculated to bring the total amount of liquid inside the porous particle to saturation. This blend of Part A and Part B is saturated and may be placed under vacuum to assure saturation of the particles. This saturated particle is referred to herein as Part C.

Part C is blended with a preselected polymer resin capable of being cured with the polymer catalyst in part B. The polymer resin, when cured with the polymer resin catalyst in Part B, is chemically stable in the volatile liquid. When the Part C resin comes into contact with the surface of the porous particle containing Parts B, the resin in contact with the surface of each particle cures to form a hardened, rigid, chemical resistant, polymer shell around each particle.

The result is hardened, frangible, chemically resistant, microcapsules of volatile liquid.

The preferred composition includes 40–50%, porous particles, 40–50% isophorone, 2–6% polymer catalyst, and 5–15% polymer resin.

A specific formula is:

Part A: 45% porous particle; 34% isophorone.

Part B: 11% Isophorone; 0.5% polymer catalyst

Part C: 9% polymer resin.

The preferred volatile liquid is isophorone (3,5,5-trimethyl-2-cyclohen-one-1) obtained from Union Carbide. A preferred porous particle is Veri-lite (ceramic refractory material in round beads) obtained from Harbison Walker Refractories Company but other porous particles, such as wood pulp, can also be used. The polymer catalyst is IFOAM Catalyst obtained from ICORP-IFOAM Specialty Products Corporation (as seen in my prior U.S. Pat. Nos. 4,092,296 and 4,773,792). The polymer resin is Bisphenol A Diglycidal Ether obtained from Shell Chemical under their formulation Epon 828.

SUMMARY OF THE INVENTION

A process of micro-encapsulating a volatile liquid includes selecting a volatile liquid, such as Isophorone, and porous ceramic particles for encapsulating the volatile liquid. The volatile liquid and porous particles are mixed and a vacuum is applied to the mixture to impregnate the volatile liquid in the porous particles. A polymer catalyst for the polymer resin, such as an epoxy catalyst for use with an epoxy resin, is mixed with the volatile liquid and porous particles to saturate the particles. The polymer resin, such as epoxy resin, is added to the mixture for forming a resin cured shell around the porous particle holding the volatile liquid to form a microencapsulated volatile liquid. The resin is only cured on the outer shell of the porous particle when coming in contact with the catalyst supported with the volatile liquid in the porous particle.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
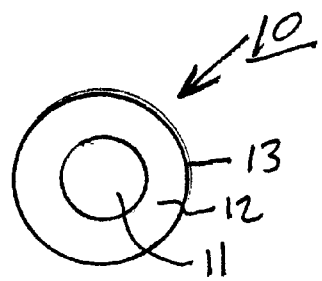
FIG. 1 is a flow diagram of the process of micro-encapsulating a volatile liquid in accordance with the present invention.

Turning to the drawings, FIG. 1 illustrates a micro-encapsulated volatile liquid 10 having a volatile liquid 11, such as Isophorone, encapsulated in the center of the micro-encapsulated ceramic bead. The volatile liquid 11 is surrounded by a combined volatile liquid and catalyst 12 which is then encased in a resin cured outer shell 13.

Figure 2:
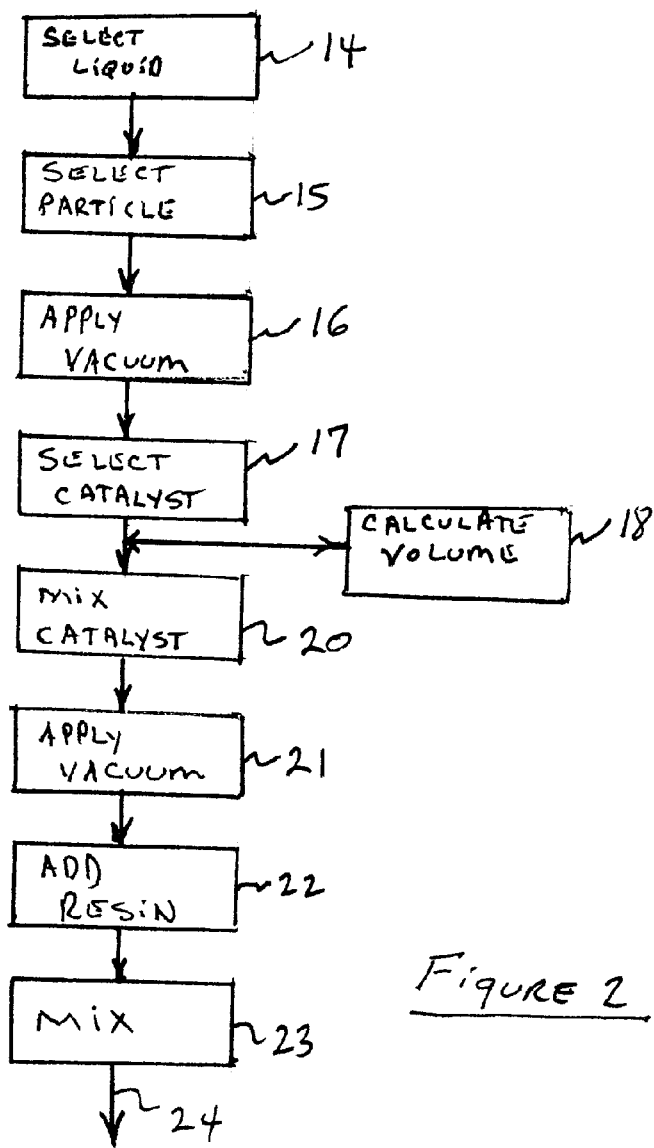
FIG. 2 is a cross-section of an encapsulated particle.

Referring to FIG. 2, the process of micro-encapsulating a volatile liquid in accordance with claim 1 is illustrated in which the first step is selecting a volatile liquid (14) to be encapsulated, such as an Isophorone solvent, and porous particles (15). The selected liquid and the selected particles are mixed together and the mixture has a vacuum applied thereto (16). A polymer catalyst is selected (17) and the volume of catalyst to particle and liquid is calculated (18) to determine the volume of a catalyst so that no excessive catalyst is provided for the volume of porous material so the beads of material will not stick together. The catalyst is mixed (20) with the porous particles having a volatile liquid therein to saturate the particles. A vacuum may be applied (21) thereto in order to assure saturation of the particles so that there is no free liquid. The saturated particles has a polymer resin added (22) thereto and the mixture is mixed (23) in a drum to provide a gentle mix of the catalyst mixed with the porous particles and volatile liquid to produce an output (24) of a micro-encapsulated volatile liquid, as seen in FIG. 1, micro-encapsulated in a resin cured with a catalyst. This provides a frangible chemical resistant micro-encapsulated volatile liquid.

The micro-encapsulated volatile liquid can be added to a coating material, such as a paint, and applied to a surface where the micro-encapsulated particles can be broken by an animal chewing on the painted surface or by a bird, such as a woodpecker, thereby releasing the volatile liquid. The volatile liquid being in this case, an Isophorone, which acts as a deterrent to animals and birds alike when the volatile liquid is released.

It should be clear at this time that a method of making a micro-encapsulated volatile liquid has been provided which micro-encapsulates a liquid into a porous particle, such as a porous ceramic, having a resin cured with a catalyst shell surrounding the porous bead portion. A porous particle is saturated with a volatile liquid having an epoxy or other catalyst mixed therein so that when a resin is added to the saturated particles, the catalyst reacts with the resin only on the surface of each particle to harden a shell on the surface of the particle encapsulating the volatile liquid in the particle. The present invention, however, should not be construed as limited to the forms disclosed which are to be considered illustrative rather than restrictive.

I claim:

1. A process of encapsulating a volatile liquid comprising the steps of:

selecting a volatile liquid to be encapsulated;

selecting porous particles;

mixing said selected volatile liquid and porous particles;

applying a vacuum to said mixed volatile liquid and particles;

selecting a catalyst for a polymer resin;

mixing said selected catalyst with said volatile liquid in said porous particles; and mixing a polymer resin with said particles having said mixed catalyst and volatile liquid therein to form an encapsulated volatile liquid.

2. The process of encapsulating a volatile liquid in accordance with claim 1 in which said selected porous particles are porous ceramic particles.

3. The process of encapsulating a volatile liquid in accordance with claim 2 in which said selected porous ceramic particles are porous ceramic beads.

4. The process of encapsulating a volatile liquid in accordance with claim 1 in which said selected porous particles are wood pulp.

5. The process of encapsulating a volatile liquid in accordance with claim 1 including the step of applying a vacuum to said porous particles having said mixed catalyst and volatile liquid therein.

6. The process of encapsulating a volatile liquid in accordance with claim 1 in which said selected volatile liquid is isophorone.

7. The process of encapsulating a volatile liquid in accordance with claim 6 in which said selected catalyst is a polymer catalyst for an epoxy resin.

8. The process of encapsulating a volatile liquid in accordance with claim 7 in which said selected resin is an epoxy resin.

9. A process of encapsulating a volatile liquid comprising the steps of:

saturating a volatile liquid and polymer catalyst into a plurality of porous particles;

mixing a polymer resin with said plurality of particles saturated with said resin catalyst and volatile liquid; and curing a shell of polymer resin over each of said plurality of particles saturated with said resin catalyst and volatile liquid to encapsulate said volatile liquid in each of said porous particles.

10. The process of encapsulating a volatile liquid in accordance with claim 9 including the step of applying a vacuum to said plurality of porous particles having said porous particles mixed with a volatile liquid and polymer catalyst.

11. The process of encapsulating a volatile liquid in accordance with claim 10 in which said saturating of said volatile liquid and polymer catalyst into a plurality of porous particles saturates a plurality of porous ceramic particle.

12. The process of micro-encapsulating a volatile liquid in accordance with claim 9 in which said saturating of said volatile liquid and polymer catalyst includes saturating isophorone and an epoxy resin catalyst into a plurality of porous particles.

* * * * *